United States Patent [19]

Fink

[11] Patent Number: 4,862,468
[45] Date of Patent: Aug. 29, 1989

[54] RAPIDLY SWITCHABLE LINE SELECTOR FOR PULSED LASERS

[75] Inventor: David Fink, Los Angeles, Calif.

[73] Assignee: Hughes Aircraft Company, Los Angeles, Calif.

[21] Appl. No.: 42,753

[22] Filed: Apr. 27, 1987

[51] Int. Cl.$^4$ .............................................. H01S 3/098
[52] U.S. Cl. ........................................ 342/19; 372/15; 372/23; 372/93; 372/102
[58] Field of Search ............... 372/9.15, 19, 20, 23, 372/24, 92, 93, 98, 101, 102, 107, 108

[56] References Cited

U.S. PATENT DOCUMENTS

| | | | |
|---|---|---|---|
| 3,443,243 | 5/1969 | Patel | 372/20 |
| 4,241,318 | 12/1980 | Comera et al. | 372/23 |
| 4,399,540 | 8/1983 | Bücher | 372/20 |

FOREIGN PATENT DOCUMENTS

| | | | |
|---|---|---|---|
| 1929123 | 12/1969 | Fed. Rep. of Germany | 372/15 |
| 1589737 | 5/1970 | Fed. Rep. of Germany | 372/15 |
| 2245108 | 4/1975 | France | 372/99 |
| 0047485 | 3/1985 | Japan | 372/99 |

OTHER PUBLICATIONS

Dewey; "Scanning A Focused Light Beam Using Two Synchronized Mirrors"; IBM Tech. Disclosure; vol. 17; No. 9, Feb. 1975; p. 2743.

McGraw-Hill Encyclopedia of Science & Technology, vol. 9, pp. 579-581.

Primary Examiner—William L. Sikes
Assistant Examiner—B. R. R. Holloway
Attorney, Agent, or Firm—W. J. Streeter; A. W. Karambelas

[57] ABSTRACT

A first embodiment includes a set of diffraction gratings on the face of a wheel, each grating being set at an angle to select a different spectral line. The wheel is rotated, and as each grating moves into the end-reflector position of the laser's optical path, the laser is fired. Alternate embodiments include a small spinning fold mirror that reflects the beam in a circle about the axis of the laser. Such embodiments include (a) a circular array of diffraction gratings arranged about the laser axis such that the tilt of the gratings and the orientation of the grooves vary as one goes around the circle and successively fires the laser at each grating; (b) both a circular array of mirrors and a corresponding array of diffraction gratings such that the grooves of all of the gratings are parallel and the gratings are all tilted in the same direction; and (c) two spinning fold mirrors and two circular arrays of mirrors giving a double fold plus a single diffraction grating wherein the optical paths are not parallel but arrive at the grating at different angles for selecting different spectral lines.

2 Claims, 3 Drawing Sheets

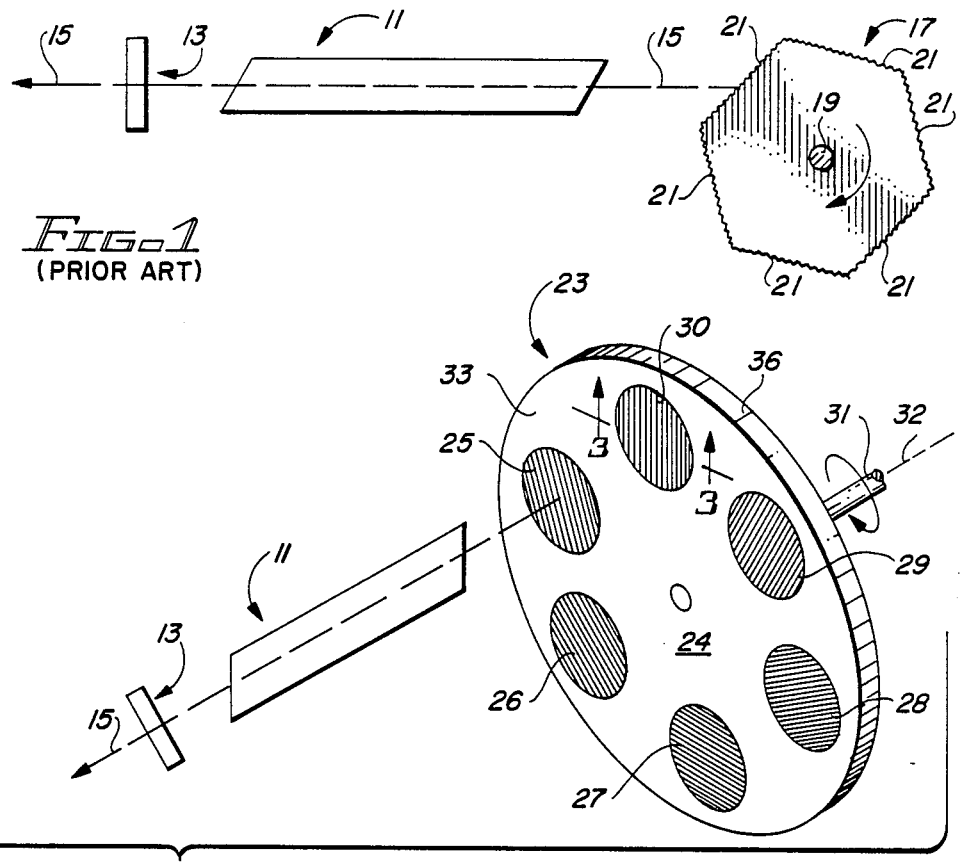
Fig.1 (PRIOR ART)
Fig.2
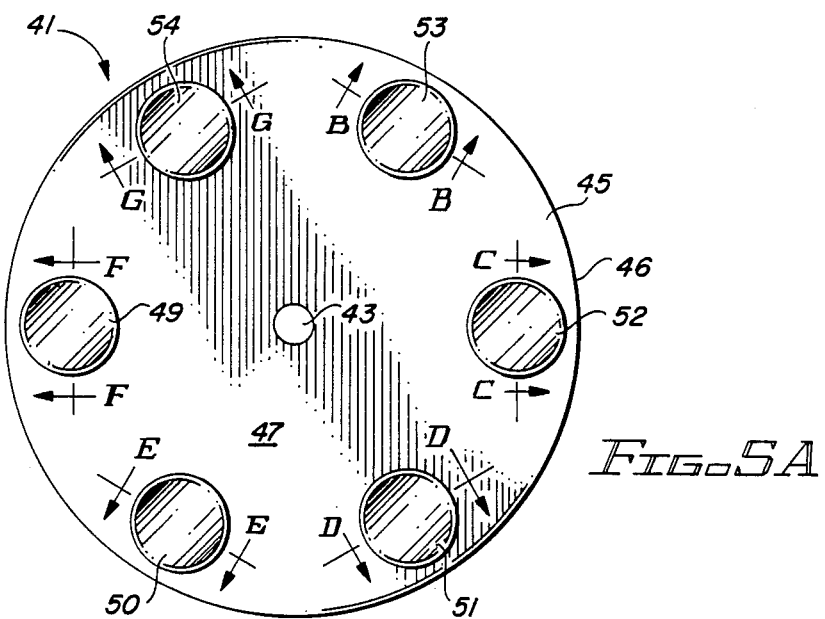
Fig.3A

RAPIDLY SWITCHABLE LINE SELECTOR FOR PULSED LASERS

BACKGROUND OF THE INVENTION

1. Field of the Invention

The present invention relates generally to a rapidly switchable line selector for pulsed lasers, and more particularly to a system that allows forcing successive pulses of a pulsed laser to be on different and distinct spectral lines.

2. Description of the Prior Art

The only prior art known to the inventor that has actually been demonstrated to work are systems using a rapid mechanical motion to change a diffraction grating's alignment. In one prior art system, the rapid mechanical motion of the diffraction grating is done by a drive that changes the angle of the diffraction grating, as with a pointing mirror. In the other known prior art system, a set of diffraction gratings is mounted on the faces of a spinning hexagonal prism. As each of the diffraction gratings comes into the correct alignment angle, the laser is fired on a different spectral line.

The spinning prism arrangement of the prior art has two major disadvantages, which will be discussed in terms of an infrared $CO_2$ laser. The primary disadvantage is a limitation of the maximum pulse repetition rate. The diffraction grating is changing alignment during the pulse, and if it turns too rapidly, the laser will go out of alignment during the pulse, clipping the pulse, and reducing the optical energy contained in it. The alignment time is not just the time during which there is significant power in the pulse, but must also include the time for the pulse to build up out of the noise. The times involved are about 0.1 to 0.3 $\mu$sec for pulse build-up from the noise, 0.1 to 0.2 $\mu$sec for the main pulse, and another $\mu$sec if the energy in the tail is also to be used, the total time being approximatey 0.2 to 2 $\mu$sec.

The alignment tolerance of the laser is about 50 $\mu$rad, so if the diffraction grating rotates faster than 50 $\mu$rad/$\mu$sec, the pulse will be clipped. Significant energy can be extracted with alignment times as small as 0.1 $\mu$sec, which allows rotation rates up to 500 $\mu$rad/$\mu$sec, but with somewhat reduced energy. These numbers convert to 50 pulses per second with full energy at a prism rotation of 8.3 Hz (500 RPM) and 500 pulses per second with reduced energy at a prism rotation of 83 Hz (5000 RPM) for a hexagonal rotating prism. The achievable pulse repetition rate scales with the number of faces on the prism, but so does the physical size of the prism, because the size of a face is determined by the laser beam size, which is approximately 1 centimeter.

A second major disadvantage of this prior art system is the requirement for precise timing of the firing of the laser relative to the angular position of the spinning prism. The alignment tolerance is, as stated above, 50 $\mu$rad, and this is achieved with a precision optical encoder wheel on the same shaft as the prism.

The prior art spinning prism system is not without it's advantages. It has the ability for random access to any spectral line by choosing the firing time relative to the angular position of the prism. But this advantage is offset by the previously described disadvantages.

The present invention solves substantially all of the problems of the prior art systems and avoids the disadvantages of the prior art while providing many advantages thereover.

BRIEF SUMMARY OF THE INVENTION

The present invention describes a rapidly switchable line selector for pulsed lasers. The invention allows forcing successive pulses of a pulsed laser to be on different spectral lines. This invention can support a higher pulse repetition frequency than was possible in the prior art, and the alignment of the laser does not change during a pulse. There are several implementations of the present invention.

In a first embodiment, a set of diffraction gratings is set on a face of a wheel. Each diffraction grating is set at an angle to select a different spectral line. The wheel is rotated, and as each grating moves into the endreflector position of the laser's optical path, the laser is fired.

In a second embodiment of the present invention, a single fixed diffraction grating is used and a set of plane mirrors are mounted on the face surface of a rotating wheel. Again, each of the plane mirrors on the face of the wheel is set at a different angle to reflect onto the diffraction grating and select a different spectral line. The wheel is rotated, and as each mirror moves into the end-reflector position of the laser's optical path, the laser is fired.

A third embodiment of the present invention has the primary advantage that it does not require the spinning of a large wheel equipped with gratings or mirrors, but needs only to spin a small fold mirror. In this embodiment, a set of diffraction gratings are placed in a circle around a small rotating fold mirror within the laser's resonator cavity. The rotating mirror subsequently reflects each of the gratings into the optical position of the end-reflector of the resonator cavity. As each grating comes into position, the laser is fired. If the polarizations of all the spectral lines are to be the same, then the orientation of the grooves of the diffraction grating and the directions of tilt of the gratings vary as one goes around the circle of diffraction gratings, which could lead to some difficulty in alignment.

Still another embodiment of the present invention, similar tothe last, eliminates the difficulty leading to possible alignment problems by introducing one more fold in the optical path. Now the grooves of all of the gratings are parallel and the gratings are all tilted in the same direction.

Lastly, in yet another embodiment, the optical paths are brought together again so that only one diffraction grating is required in the end-reflector position. This embodiment has to have each path select a different spectral line, and this is done by setting the angles of the additional fold mirrors so the paths are not all parallel as they arrive at the grating but are incident on the grating at different angles, thereby selecting different spectral lines. This embodiment utilizes a combination double fold mirror with two rings of plane mirrors, one about each of the fold mirror faces.

The common concept present in all of the embodiments is to switch the laser along different paths, each adjusted to select a different and distinct spectral line. Each of the above-identified embodiments does just that.

These and other objects and advantages of the present invention will be more fully understood after reading the detailed description of the preferred embodiments, the claims, and the drawings, which are briefly described hereinbelow.

BRIEF DESCRIPTION OF THE DRAWINGS

In the accompanying drawings:

FIG. 1 is a schematic representation of a prior art system for selecting different spectral lines for a pulsed laser;

FIG. 2 is a perspective illustration depicting one embodiment of the rapidly switchable line selector for pulsed lasers of the present invention;

FIG. 5A is a front view of the mirror wheel of FIG. 4;

DETAILED DESCRIPTION OF THE PREFERRED EMBODIMENTS

Figure 4:
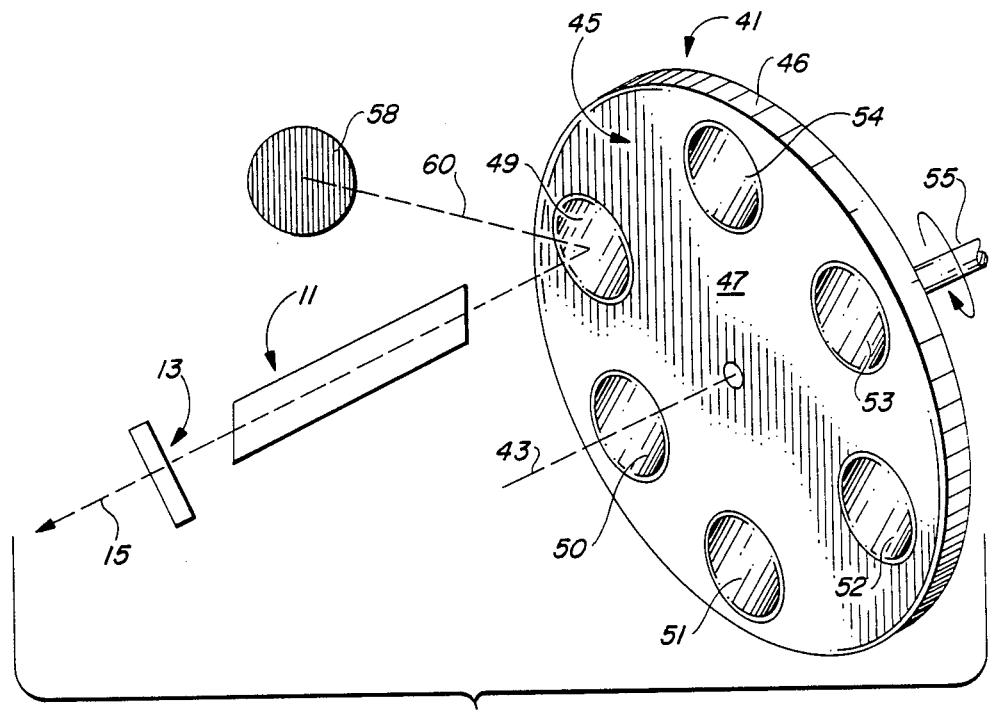
FIG. 4 is a perspective illustration of a second embodiment of the rapidly switchable line selector for pulsed lasers of the present invention.

The rapidly switchable line selector system for pulsed lasers of the present invention allows the forcing of successive pulses of a pulsed laser to be on different and distinct spectral lines. The present system can support a much higher pulse repetition frequency than was previously possible in the prior art, and the alignment of the laser does not change during a pulse.

In a first embodiment of the present invention, a set of diffraction gratings are provided on the face of a rotating wheel. Each diffraction grating is set at a unique angle to select a different spectral line. As the wheel is spun or rotated, each of the diffraction gratings moves to the end-reflector position of the laser's optical path and the laser is fired to produce output at a preselected different and distinct spectral line from that of the previous firing.

In FIG. 1, a system of the prior art is shown. A laser is shown as passing an optical beam 15 through an output mirror 13. A rotating hexagonal prism or wheel 17 is provided with six different and distinct faces. Each of the faces includes a diffraction grating 21, and the wheel 17 is rotated about its central axis 19 in a clockwise direction. As the beam 15 diffracts from the diffraction grating, the wavelength that is diffracted back upon the incident direction changes as the prism rotates, and hence different spectral lines are selected for the optical pulse out of the laser 11. As each diffraction grating of each of the surfaces 21 comes into the correct optical alignment, the laser 11 is fired.

The spinning prism method is the closest prior art known and it has two major disadvantages and one good feature. A first or primary major disadvantage is the limitation on the maximum pulse repetition rate. The diffraction grating is changing alignment continuously during the pulse, and if it turns or rotates too rapidly, the laser will go out of alignment during the pulse, thereby clipping the pulse and reducing the optical energy contained in it. The alignment time is not just the time during which there is significant power in the pulse, but it must also include the time for the pulse to build up out of the noise. The times involved are generally about 0.1 to 0.3 $\mu$sec for pulse build-up from the noise, 0.1 to 0.3 $\mu$sec for the main pulse, and another 1 $\mu$sec if the energy in the tail is also to be used. This results in a total time of 0.2 to 2.0 $\mu$sec.

The alignment tolerance of the laser is about 50 $\mu$rad, so if the diffraction grating rotates faster than 50 $\mu$rad/$\mu$sec, the pulse will be clipped. Significant energy can be extracted with alignment times as small 0.1 $\mu$sec, which allows rotation rates of up to 500 $\mu$rad/$\mu$sec, but with somewhat reduced energy. These numbers convert into 50 pulses per second with full energy at a prism rotation of 8.3 Hz (500 RPM) and 500 pulses per second with reduced energy at a prism rotation of 83 Hz (5000 RPM), for a hexagonal prism. The achievable pulse repetition rate scales with the number of faces on the prism, but so does the physical size of the prism, because the size of a face is determined by the laser beam size, which is approximately 1 centimeter per face.

Another major disadvantage of the prior art system is the requirement for precise timing of the firing of the laser relative to the angular position of the spinning prism. The alignment tolerance is, as stated above, 50 $\mu$rad, and this is achieved with a precision optical encoder wheel on the same shaft as the prism. The advantage of this system lies in its ability for random access to any particular spectral line by choosing the firing time relative to the angular position of the prism. The present invention is limited to a fixed set of spectral lines, although the set can be changed simply by realigning the gratings in the first implementation or the mirrors in the second implementation, etc.

FIG. 2 illustrates a pulsed laser system utilizing the rapidly switchable line selector of the first embodiment of the present invention. In FIG. 2, the pulsed laser 11 has its optical output beam 15 passing through an output mirror 13. In the end-reflector position is a diffraction grating disk 25 mounted on the face 24 of a rotating circular wheel 23. The wheel 23 has a body portion 33 including a generally planar face 24 and an outer peripheral rim 36. The wheel is driven in a clockwise direction by shaft or axle 31 about an axis of rotation 32 so as to spin the various diffraction grating disks 25, 26, 27, 28, 29, and 30 sequentially into the end-reflector position as the wheel rotates.

It will be realized that the set of diffraction grating disks disposed on the face of the wheel 23 of the present invention can include different numbers of diffraction grating disks "n" other than six, where "n" is a positive whole number. Each of the gratings is set at an angle to select a different spectral line. As the wheel 23 is spun or rotated, and as each of the gratings 25-30 moves into the end-reflector position of the laser's optical path, the laser is fired. If the laser axis is parallel to the axis of rotation of the wheel, then each grating must be set in the wheel at it's Littrow angle, but if the angle between the laser axis and the axis of rotation is set equal to the average Littrow angle of the gratings, then the angles of the gratings in the wheel are reduced. This can be important if the power to drive the wheel is a factor because the angled gratings will act as fan blades to blow air around.

Figure 3A:
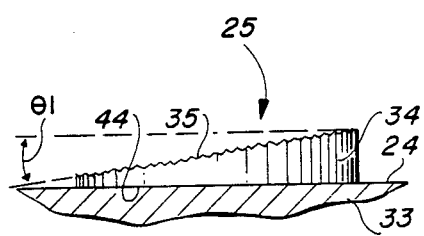
FIGS. 3A, 3B, and 3C illustrate different angles at which the diffraction grating disks may be mounted on the face surface of the wheel of FIG. 2.
Figure 3B:
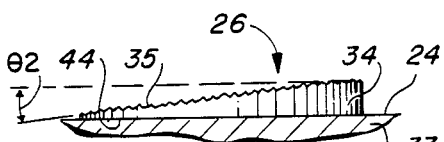
Figure 3C:
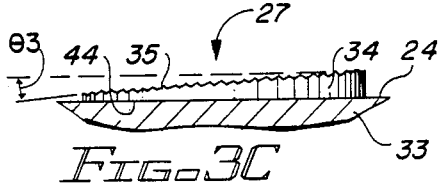

FIGS. 3A, 3B, and 3C each show a diffraction grating disk 25, 26, 27 having a body portion 34 with it's lower surface 44 secured to the face 24 of the wheel body 33 so that the diffraction grating surface 35 is disposed at a required angle to produce the necessary spectral line. In FIG. 3A, for example, the intersection of the plane of the diffraction grating face 35 and the face 24 of the wheel body 33 form an angle $\theta_1$, while an angle $\theta_2$ is shown as being formed in FIG. 3B, and an angle $\theta_3$ is formed in FIG. 3C. Each of the angles is adjusted by the positioning of the angle of the diffraction grating surface 35 so as to produce a predetermined spectral line as the diffraction grating face 35 passes in the end-reflector position of the laser's optical path and the laser is fired.

FIG. 4 shows a pulsed laser system using the rapidly switchable line selector system as the second embodiment of the present invention. In FIG. 4, the laser 11 is shown as outputting an optical beam 15 through an output mirror 13. The end-reflector position is provided by a plurality of "n" generally circular mirrored disks 49, 50, 51, 52, 53, and 54 where "n" is a positive whole number. The disks 49-54 are adhered to or carried by the generally planar front surface 47 of a circular wheel 41. The wheel 41 includes a body portion 45 sustaining the front planar face 47 and having an axle or shaft 55 for driving the wheel in a clockwise direction about an axis of rotation 43.

In this embodiment, the single fixed diffraction grating 58 is used in conjunction with a set of plane mirrors 49-54 disposed on the front surface or face 47 of a wheel 41. Each of the circular disk-like mirrors 49-54 is set at a different angle to reflect a beam 60 onto the diffraction grating 58 and select a different and distinct spectral line. As the wheel 41 is spun or rotated, each of the generally circular mirrored disks 49-54 will come into the end-reflector position of the laser's optical path and the laser will be fired. Each of the laser firings will result in a different and distinct spectral line.

FIG. 5A shows a front view or face view of an alternate embodiment to the diffraction grating wheel 23 of FIG. 2. In FIG. 5A, a generally circular mirror wheel 41 is shown as having a generally planar front surface 47, a body portion 45 and an outer peripheral rim 46. A plurality of mirrors 49, 50, 51, 52, 53, and 54 are shown as being secured or attached to or on or carried by the surface 47 of the wheel 41. The wheel rotates about it's central axle or axis 43.

Figure 5B:
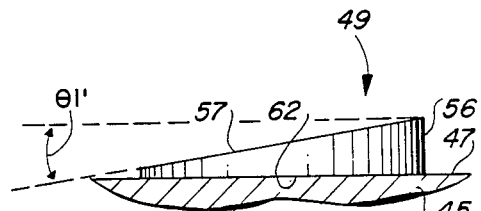
FIGS. 5B, 5C, and 5D illustrate various mounting angles of the mirrored disks on the front surface of the mirror wheel of FIG. 5A.
Figure 5C:
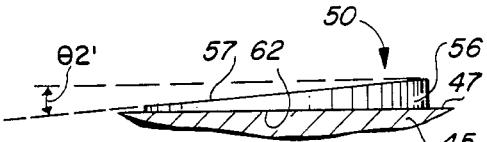
Figure 5D:
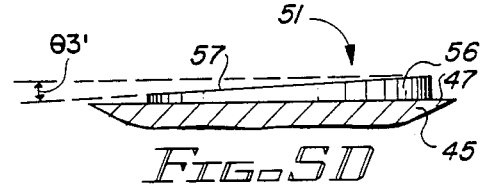

FIGS. 5B, 5C, and 5D show three of the mirrors 49, 50, and 51 as being mounted in different angular positions about the surface 47 of the wheel 41 of the present invention. Each of the circular disk mirrors 49, 50, 51 is shown as having a body portion 56 and a mirror surface 57. The wheel body is represented by reference numeral 45 and it will be seen that the back, bottom, or lower surface 62 of the mirrored body 56 is secured onto the planar face 47 of the body portion 45 of the wheel 41 so that the mirror face 57 provides different required angles for producing the different spectral lines. It will be seen that the angular placement of the first mirrored disk 49 produces an angle $\theta'$, while the second mirrored disk 50 produces an angle $\theta'_2$, and the third mirrored disk 51 produces an angle $\theta'_3$. These angles will result in the production of three different spectral lines as the mirrored surfaces are rotated and each mirror surface passes into the end-reflector position of the laser's optical path and the laser is fired so as to select a different and distinct spectral line for each mirror.

The difference between the first embodiment and the second lies in replacing the wheel of diffraction gratings with a wheel of mirrors, each of which reflects the optical beam differently onto a single diffraction grating. Each of the mirrors is set at an angle to reflect onto the grating and select a different and distinct spectral line so that as the wheel is spun or rotated, and as each mirror moves into the reflector position of the lasers optical path, the laser is fired. As with the first embodiment, the angle between the laser axis and the rotation axis can be chosen to reduce the angles between the mirrors and the wheel face to reduce the fan action.

Utilizing six optical positions for the circular mirrored disks 49-54 of the present invention, a wheel rotation rate of 83 Hz (5000 RPM) will provide a pulse repetition rate of 500 Hz. If the optics on the wheel have one centimeter apertures, the wheel is only three centimeters in diameter. By going to a 15 centimeter diameter wheel with 30 optical positions rotating at 166 Hz (10,000 RPM) the pulse repetition rate can be made 5000 Hz with full laser energy in each pulse.

The common concept among all of the embodiments of the present invention is to provide a method and system or apparatus to switch the laser among different optical paths. Each of the paths must be adjusted to select a unique different and distinct spectral line. With this in mind, yet another embodiment of the present invention can be described. In the remaining embodiments, the variations on the rapidly switchable line selection method of the present invention have the advantage that the they do not have to spin a large wheel with diffraction gratings or mirrors carried on its face, but need only spin a relatively small, lightweight, fold mirror.

Figure 6:
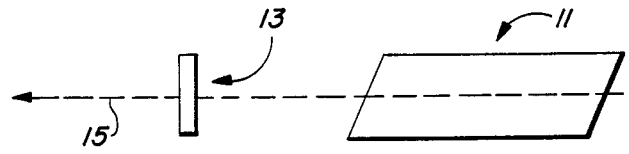
FIG. 6 is a schematic illustration of a pulsed laser system using a third embodiment to accomplish spectral line switching.

In the first embodiment of this concept, a set of diffraction gratings are placed in a circle around a small rotating fold mirror disposed within the resonator cavity. The rotating mirror sequentially reflects each of the gratings onto the optical position of the end-reflector of the resonator cavity. As each grating comes into position, the laser is fired. While only two gratings are shown in FIG. 6, it will be realized that they are in the plane of the paper, but more are distributed around a circle perpendicular to the plane of the paper. If the polarization of all of the spectral lines are to be the same, then the orientation of the grooves and the directions of tilt of the diffraction gratings vary as one goes around the circle of gratings. This could lead to some alignment difficulties.

In FIG. 6, a pulsed laser 11 is shown as generating or outputting an optical beam or laser beam 15 through an output mirror 13. A rotating fold mirror assembly 59 is shown as having a body portion 71, an axle or shaft 67 for rotating the mirror face 61, and an axis of rotation 69. A point of incidence 65 shows the optical beam 15 reflected off of the mirrored surface 61 and the reflected beam 63 being then reflected onto the surface of the diffraction grating 73 of one of the "n" diffraction gratings 73 of the circle or set, where "n" is a positive whole number. For example, if a six diffraction grating circle were used, the lower or bottom diffraction grating 75 would be the fourth, while the second and third and fifth and sixth would be out of the plane of paper of FIG. 6.

Figure 7:
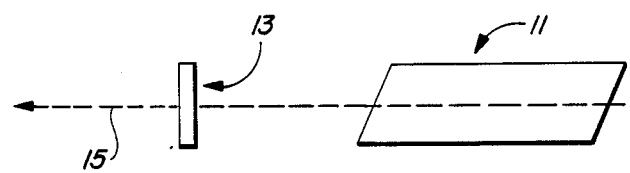
FIG. 7 is a schematic illustration of a pulsed laser system representing still another embodiment of the present invention.

In order to solve the possible alignment problem that could result in the embodiment of FIG. 6, the embodiment of FIG. 7 is proposed. In this embodiment, any potential alignment difficulty is eliminated by introducing one more fold into the optical path. Now the grooves of all of the gratings are parallel and the diffraction gratings themselves are all tilted in the same direction.

In FIG. 7, the laser 11 is shown as outputting the laser beam 15 through an output mirror 13. The system includes a rotating fold mirror assembly 59 having a body portion 71 and an axle or rotating shaft 67 for rotating the diagonal face 61 of the mirror about the axis of rotation 69. The optical beam 15 is shown as striking the mirrored surface 61 of the fold mirror assembly 59 at the point of impingement or incidence 65 and then as reflected beam 63 to the face of a plane mirror 77. The mirror 77 is part of a circular array of mirrors disposed about a plane drawn through the point of impingement 65 and perpendicular to the axis of rotation 69. For example, the mirror 77 could be the first in a set of six mirrors while the bottom or opposite mirror 79 would be the fourth, and similarly, for different numbers of mirrors in the circular array.

Mirror 77 is shown as having a point of impingement or point of incidence 83 on it's face, which reflects optical beam 85 onto the face of a diffraction grating 81. In fact, as the mirrored surface 61 of the fold mirror 59 rotates, the beam reflected off of the point of incidence 65 and represented by reference numeral 63' will be reflected off the surface of the mirror 79 to also impinge on the corresponding paired diffraction grating surface of the grating 80. In this manner, the extra fold allows the grooves of all of the diffraction gratings to be parallel and the planes of all of the diffraction gratings are tilted in the same general direction so as to pass the reflected optical beam off of the mirrored surface and onto the corresponding paired diffraction grating of the circular array of gratings of FIG. 7. It will be seen that there is one diffraction grating for each plane mirror such as diffraction grating 81 in the circular array corresponding circular to mirror 77 of the circular array. Similarly, the mirror 79 corresponds to the diffraction grating 80 of the corresponding array of diffraction gratings.

Figure 8:
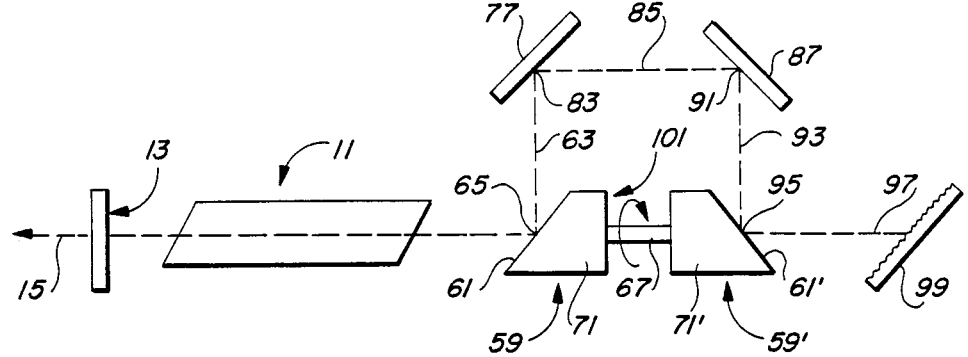
FIG. 8 is a schematic diagram of a pulsed laser system illustrating yet a further embodiment of the present invention.

The idea can be carried still further as shown in the embodiment of FIG. 8. In FIG. 8, the paths are brought together again or folded back so that only one single diffraction grating 99 is required for the entire system. While we still have to have a different path selected to produce a different spectral line, this is done by setting the angles of the additional fold mirrors so the paths are not all parallel as they arrive at the diffraction grating, but are incident on the grating at different angles, thereby selecting different spectral lines.

FIG. 8 shows a laser 11 having a laser output beam 15 passing through an output mirror 13. A double fold mirror assembly 101 includes a first fold mirror assembly 59 and a second fold mirror assembly 59'. The first mirror assembly 59 has a fold mirror body 71, a diagonal mirrored surface 61, and a rotating shaft 67 shared in common with the second fold mirror assembly 59'. The second fold mirror assembly 59' includes a body portion 71' and a slanted or diagonal mirrored surface 61'. The point of incidence or impingement 65 is shown on the front surface 61 of the fold mirror body 71 so the beam 15 is reflected as reflected beam 63 to impinge on impingement point 83 of the mirror 77 of a similar multi-mirror array as previously described with reference to FIG. 7. This beam then reflects off of the surface of the mirror 77 as reflected beam 85, which is again reflected off the point of impingement 91 of a mirror 87 of a second circular mirror array as reflected beam 93. Beam 93 then strikes the point of impingement or incidence 95 of the surface 61' of the folded mirror 71', and the reflected beam 97 strikes the single diffraction grating 99. Similarly, it will be understood that the system of FIG. 8 uses two circular arrays of plane mirrors with one being in a circle whose plane is generally perpendicular to the axis of rotation of the shaft 67 and parallel to the second circular array of mirrors, 87, 89 whose plane is also perpendicular to the axis of rotation of the shaft 67 and generally parallel with the plane of the first circular array of mirrors 77, 79. In this manner, as each of the mirrors of the first array including mirrors 77 and 79 pass into the optical path and reflect the beam to a corresponding mirror of the second circular array, the second circular array folds back or reflects back the beam off of the surface of a second rotating mirror so that all of the optical beams terminate on the single diffraction grating 99. Again, since different optical paths are selected by the tilt angles of the mirrors of both the circular arrays, different and distinct spectral lines are selected each time the laser is pulsed. Each time the pair of mirrors passes into the optical path of the laser, and occupies the end-reflector position, the laser is pulsed.

In this specification, the graphic symbol used in the drawings and assigned reference numbers 11 or 13 is referred to as a "laser". It will be understood that the laser actually includes the gain media, resonant cavity, output mirror, corrective optics, and end reflector. However the term will be used herein to mean all parts of the complete laser not otherwise shown.

It will be readily seen by those having ordinary skill in the art that various modifications, variations, substitutions, changes, and alterations can be made in the apparatus, the method, and the system of the present invention without changing the spirit and scope thereof, which is limited only by the appended claims.

What is claimed is:

1. In a method for rapidly switching a pulsed laser between different and distinct spectral lines, said laser having an optical path, an end-reflector position in said optical path, and a resonant cavity
   having a preselected gain medium therein, wherein the improvement comprises
   the steps of:
   connecting a common shaft between a pair of first and second fold mirrors whose diagonal mirror faces are directed in different directions from one another;
   arranging a first set of "n" plane mirrors in a first circular array about the face of the first one of said fold mirrors;
   arranging a second corresponding set of "n" plane mirrors in a second circular array about the face of the second one of said fold mirrors;
   orienting the reflective faces of each of said first and second circular arrays of "n" mirrors opposite one another so that they face generally toward one another such that each of said second set of "n" mirrors receives a beam reflected from a corresponding one of the first set of "n" mirrors;
   positioning a single diffraction grating in the end-reflector position of the laser's optical path; and
   rotating the common shaft of said first and second fold mirrors for simultaneously rotating the diagonal faces of each in synchronism with one another;

impinging the laser beam on the diagonal mirror face of the first rotating fold mirror;

reflecting said beam therefrom and impinging it on a face of one of the "n" mirrors in said first circular array;

reflecting said beam onto the face of a corresponding mirror in the second circular array;

reflecting said beam onto the diagonal mirror face of the second rotating fold mirror;

impinging the beam onto the single diffraction grating occupying the end-reflector position of the laser's optical path; and selecting different and distinct spectral lines as each of the mirror pairs of the first and second arrays pass into the laser's optical path with the rotation of said fold mirrors to bring the reflected beam to the single diffraction grating at different angles of incidence.

2. In a system for rapidly switching a pulsed laser between different and distinct spectral lines said a laser having a resonant cavity, with a preselected gain medium therein, an optical path, and an end-reflector position in said optical path wherein the improvement comprises:

a first rotatable fold mirror having a shaft, an axis of rotation, and a first diagonal mirror surface;

a second rotatable fold mirror having a shaft, an axis of rotation, and a second diagonal mirror surface;

means for connecting the rotatable shafts of said first and second fold mirrors commonly together for synchronizing the rotation of said first diagonal mirror surface with the rotation of said second diagonal mirror surface to produce a double fold mirror configuration;

a first circular array of mirrors disposed about said first fold mirror;

a corresponding second circular array of mirrors disposed about said second fold mirror, the number of mirrors in said first circular array being equal to the number of mirrors in said second circular array and each of the mirrors in said first circular array corresponding to exactly one of the mirrors in said second circular array for forming mirror pairs disposed in the laser's optical path;

a single diffraction grating means;

the faces of the mirrors in said first circular array being generally disposed toward the faces of the mirror in said second circular array such that when the optical beam from said laser is reflected off of the rotating diagonal face of the first fold mirror, the reflected beam impinges on the faces of one of the mirror pairs before it is reflected to impinge upon the second rotating diagonal mirror surface of the second fold mirror to be finally reflected onto the surface of said single diffraction grating means;

means for simultaneously rotating both of said fold mirrors in synchronism with one another for reflecting the optical beam from said laser to said mirror pairs and folding the beam back to the diagonal face of the second fold mirror and to said single diffraction grating so that each of the corresponding pairs of mirrors are sequentially placed into the laser's optical path such that the beam arrives at said single diffraction grating means at different and distinct angles; and means for firing said laser each time a different one of said pairs of corresponding mirrors is struck by the beam, thereby generating said different and distinct spectral lines.

* * * * *

UNITED STATES PATENT AND TRADEMARK OFFICE
CERTIFICATE OF CORRECTION

PATENT NO.  : 4,862,468
DATED       : August 29, 1989
INVENTOR(S) : DAVID FINK

It is certified that error appears in the above-identified patent and that said Letters Patent is hereby corrected as shown below:

```
Claim 2, line 2, column 9, insert a comma after
                 "lines"; and
           line 3, column 9, delete "a", the first
                 occurrence.
```

Signed and Sealed this

Twenty-seventh Day of October, 1992

Attest:

DOUGLAS B. COMER

*Attesting Officer*          *Acting Commissioner of Patents and Trademarks*